United States Patent
Juan Lien Chang

(10) Patent No.: US 8,191,699 B2
(45) Date of Patent: Jun. 5, 2012

(54) FRICTION CLUTCH

(75) Inventor: Raymundo Juan Lien Chang, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 447 days.

(21) Appl. No.: 12/322,068

(22) Filed: Jan. 26, 2009

(65) Prior Publication Data

US 2009/0200132 A1   Aug. 13, 2009

Related U.S. Application Data

(60) Provisional application No. 61/062,464, filed on Jan. 25, 2008.

(51) Int. Cl.
*F16D 13/71* (2006.01)
*F16D 23/14* (2006.01)

(52) U.S. Cl. ............... 192/89.24; 192/89.25; 192/98

(58) Field of Classification Search ............... 192/89.22, 192/89.24, 89.25, 98
See application file for complete search history.

(56) References Cited

U.S. PATENT DOCUMENTS

| | | | | | |
|---|---|---|---|---|---|
| 4,565,271 | A | * | 1/1986 | Lassiaz | 192/89.24 |
| 4,919,246 | A | * | 4/1990 | Gay et al. | 192/89.22 |
| 5,284,233 | A | * | 2/1994 | Feigler | 192/98 |
| 5,314,051 | A | * | 5/1994 | Marie et al. | 192/89.22 |

FOREIGN PATENT DOCUMENTS

| | | | |
|---|---|---|---|
| DE | 3424227 A1 | * | 1/1986 |
| GB | 2193284 A | * | 2/1988 |

* cited by examiner

*Primary Examiner* — Richard M. Lorence
(74) *Attorney, Agent, or Firm* — Alfred J. Mangels

(57) ABSTRACT

A pull-type friction clutch having an annular part that is axially clamped to a disk spring and is axially fixedly connectable to an actuation sleeve of an actuation system. The annular part has axially raised lugs on its face bearing against the disk spring, and the lugs engage in slots that are provided between the disk spring tongues where the tongues are appropriately widened, to provide a form locking connection in the peripheral direction. As a result of the peripherally fixed attachment of the annular part to the disk spring, wear caused by a relative twist between the annular part and the disk spring is prevented.

5 Claims, 3 Drawing Sheets

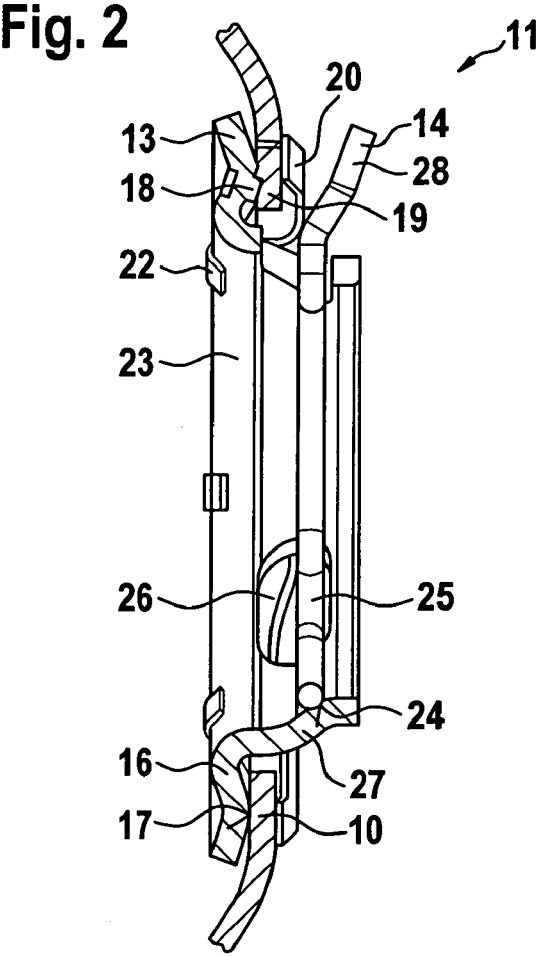
Fig. 2
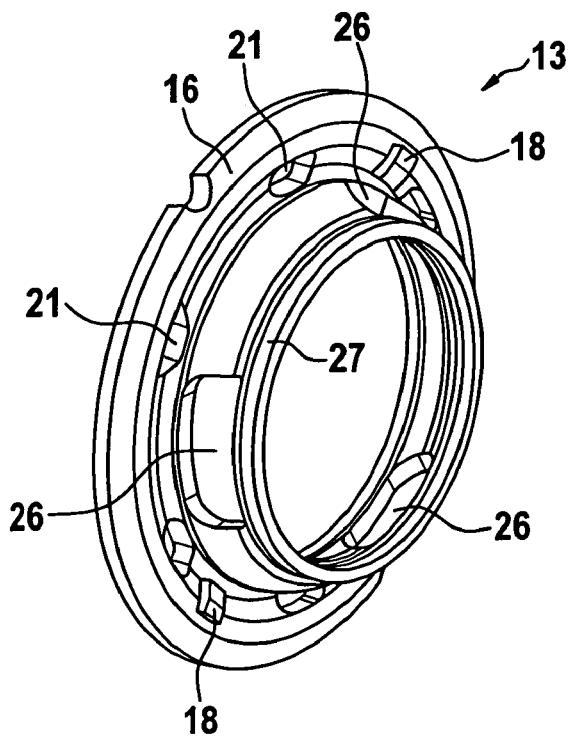
Fig. 3
Fig. 4

FRICTION CLUTCH

BACKGROUND OF THE INVENTION

1. Field of the Invention

The present invention relates to a pull-type friction clutch having a compression plate and an axially displaceable pressure plate that is acted upon by a disk spring. An annular part that extends behind the disk spring is axially clamped to the spring and is axially fixedly connectable to an actuation sleeve of a clutch actuation system.

2. Description of the Related Art

Friction clutches are known from the prior art. To enable pull, for example a pull or push of the friction clutch to the engaged position or to the disengaged position, there is provided on the side of the disk spring facing the pressure plate an annular part that reaches radially over the disk spring. A sleeve part of the friction clutch, which is axially fixedly connected to the annular part, acts axially thereon in the direction of the transmission and is actuated by the actuation system. The actuation system, which is arranged to be rotatably fixed, is uncoupled from rotation by the actuation sleeve. As a result, the pressure plate, which is axially displaceable in the housing of the friction clutch, is acted upon by the disk spring and is clamped against the compression plate, the friction linings of the clutch disk being arranged between the compression plate and the pressure plate. The actuation sleeve is displaced by means of a hydrostatic entraining cylinder that is arranged around the transmission input shaft, or mechanically by means of an externally actuated lever.

Varying the load on the friction clutch has the effect of transmitting a load moment from the fixed actuation system through the roller bearing and the actuation sleeve to the annular part, and that load moment can result in wear on the disk spring and/or the annular part.

An object of the present invention is thus a friction clutch that is resistant to wear of that kind.

SUMMARY OF THE INVENTION

The object is achieved by a friction clutch having a compression plate, a housing, and a pressure plate. The pressure plate is rotatably fixed and is axially displaceable in relation to the compression plate and the housing by a disk spring that is supported against the housing. An actuation device is fixedly arranged relative to the housing and is uncoupled from rotation to exert a pulling movement on disk spring tongues that are arranged radially inwardly on the disk spring. An annular part is provided with a flange on the side of the disk spring tongues and axially facing the pressure plate, wherein the flange extends radially over the disk spring tongues and is axially biased by the disk spring tongues and form-lockingly connectable to an actuation sleeve of the actuation device. The flange has an effective form-locking circumferential connection with the disk spring tongues. As a result of that form-locking connection, secure entraining of the annular part by the disk spring is achieved, with the result that axial clamping of the annular part on the disk spring has to be exerted less forcefully, since there is no need for an alternative friction fit between the annular part and the disk spring. The component that clamps the annular part to the disk spring can be made lighter and simpler, with the result that in the simplest case only one means of preventing detachment need be retained.

An advantageous exemplary embodiment is provided by an annular part having a flange that has axially projecting lugs that are circumferentially distributed on its side facing the disk spring tongues, and that engage in slots provided between the disk spring tongues. The slots are advantageously formed by respective pairs of mutually adjacent disk spring tongues. To make allowance for changes in the slots during axial action on the disk spring, a profile can be provided at the tips of the disk spring tongues that widens the slots. For example, the disk spring tongues can be stamped or finished by the removal of material from the tips thereof at faces pointing in the peripheral direction. Thereby the ends of the disk spring tongues pointing in the radial direction can be rounded. The lugs can have a similarly rounded profile in their cross section, with the result that rolling is made possible in the slots and the annular part can be positioned better on the disk spring.

To enable the annular part coupled to the actuation system to be centered in relation to its axis of rotation, the radial extent of the widened slots can be greater than the radial extent of the lugs.

The annular part can be clamped by means of a spring part that is supported axially on the opposite side of the disk spring tongues to that side in contact with the pressure plate, and that extends axially through the annular part and clamps the annular part axially against the disk spring tongues by radially angled tongues. The tongues can thereby be angled radially inward and/or radially outward in the radial direction.

An axial extension, with which the sleeve part axially overlaps, can be provided on the annular part for receiving the actuation sleeve, wherein the axial extension and the actuation sleeve are axially fixedly secured to one another. That axial securement can be in the form of a shaped wire spring or a securing ring against which a radially widened extension that is provided in the actuation sleeve is supported. Advantageously, the annular part can have openings in which a shaped wire spring that acts over a peripheral region engages with appropriately shaped lugs that can be displaced to a limited extent when the actuation sleeve is pushed into the profile of the openings, wherein the shaped wire spring, which is open on one side, is widened by a phase made on the radial protrusion and, when the actuation sleeve is pushed in further, snap-fits over the extension and fixes the actuation sleeve on the annular part. The two parts are separated by widening the ends of the shaped wire spring, and for that purpose the ends can have corresponding wings. The actuation sleeve and/or the annular part are advantageously produced by a descending tool, for example from sheet metal by a deep drawing method or other sheet metal forming methods.

The proposed pull-type friction clutch can be a tensioned-open or tensioned-closed friction clutch. In the case of a tensioned-open friction clutch, the disk spring is clamped to the housing such that in the absence of a tensile force acting on the actuation sleeve the friction linings of the clutch disk are clamped between the compression plate and the pressure plate with the maximum force, and the maximum moment that the friction clutch can transmit is transmitted. The disk spring is thereby advantageously supported radially outwardly against the housing and forms a single-armed lever with the annular part at the disk spring tongues. The pressure plate provides an annular contact surface, radially between the outside force-exerting rim and the disk spring tips, to support the spring force. When a pulling force acts on the actuation sleeve, as a function of the distance by which the disk spring is raised away from the contact surface, with the support of the plate spring between the housing or pressure plate on the one hand and the contact pressure plate on the other, clamping of the disk spring against the contact pressure plate is released and so the transmissible moment of the friction clutch through a slipping friction clutch is successively reduced until the friction clutch is fully disengaged.

In the case of the push-type friction clutch, the disk spring serves as a two-armed lever, and when no pulling force acts on the actuation sleeve one end of the two-armed lever abuts radially outward against the pressure plate, which is at the maximum spacing from the compression plate, such that the friction clutch remains disengaged. Between the contact surface of the pressure plate and that of the disk spring tongue tips, the disk spring is supported against the housing such that when a pulling force is applied to the actuation sleeve the contact pressure plate increasingly clamps the friction linings to the compression plate. It will be appreciated that in the case of a tensioned-closed friction clutch a relatively rigid lever system can be used instead of the disk spring.

BRIEF DESCRIPTION OF THE DRAWINGS

The structure, operation, and advantages of the present invention will become further apparent upon consideration of the following description, taken in conjunction with the accompanying drawings in which:

FIG. 2 is a longitudinal cross section of a tensioning device of the friction clutch shown in FIG. 1;

FIG. 3 is a perspective view of an annular component of the tensioning device shown in FIG. 2;

FIG. 4 is an enlarged, fragmentary cross-sectional view of a portion of the annular part component of FIG. 3.

DESCRIPTION OF THE PREFERRED EMBODIMENTS

Figure 1:
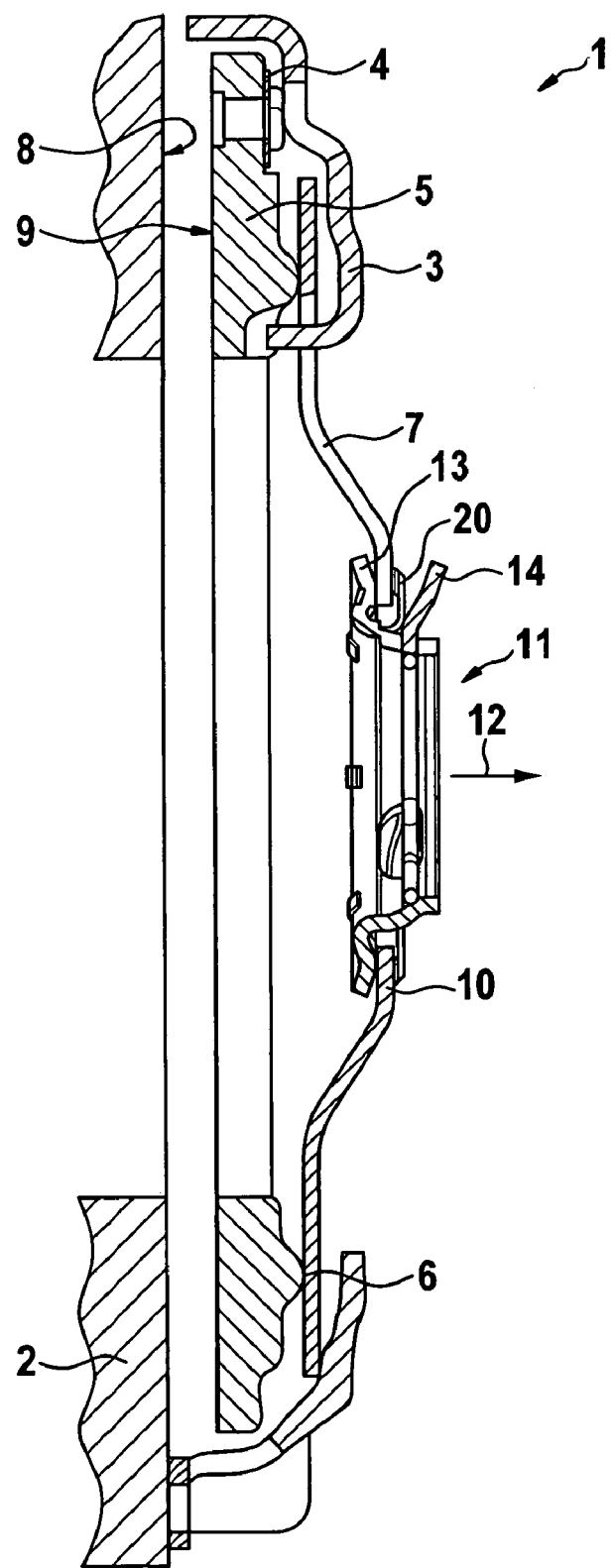
FIG. 1 is a longitudinal cross section of an exemplary embodiment of a pull-type friction clutch.

FIG. 1 shows an exemplary embodiment of a pull-type friction clutch 1 in the engaged condition, but only indicating a compression plate 2, a housing 3 that is secured to the compression plate, and a pressure plate 5 that is non-rotatably and axially displaceably arranged on the housing 3 or on the compression plate 2 by means of plate springs 4. A force-exerting rim of a disk spring 7 contacts an annular face of the housing 3, or contact lobes 6 that are circumferentially distributed, and biases the pressure plate 5 against the compression plate 2. Friction linings of a clutch disk (not shown) are clamped between the friction faces 8, 9 of the compression plate 2 and the pressure plate 5.

To disengage the friction clutch 1, the tongues 10 of the disk spring 7 are urged axially in the pulling direction 12 by the pulling device 11, wherein the pulling device 11 is axially actuated by an actuation device (not shown) and is uncoupled from rotation relative to the actuation device. For that purpose, an actuation sleeve (not shown) having a return element is pushed axially into the central opening in the annular part 13 and is axially fixed by means of the shaped wire spring 14. The actuation sleeve is connected to the actuation device by means of a roller bearing, which can be a central disengaging means that is actuated hydrostatically, pneumatically, or mechanically, for example, by means of an external lever. The annular part 13 is secured to the disk spring tongues 10 by means of a spring part 20.

FIG. 2 shows a detail of the pulling device 11. The annular part 13 has a radially widened flange 16 that radially overlaps the disk spring tongues 10, so that if the annular part 13 is acted upon by the actuation device the disk spring tongues 10 are carried along. The flange 16 includes a bend relative to its radial extent, with the result that during the engaging and disengaging movements the disk spring tongues 10 can roll on the annular crowned bearing surface 17 that is formed as a result of the bend, despite having a substantially radial path.

In the region of the radial flange 16, several outwardly extending circumferentially distributed lugs 18 are provided, such as by means of a forming method, and axially engage slots 19 that are formed between two disk spring tongues 10. As a result of the axial engagement of the lugs 18 in the slots 19, the annular part 13 is received on the disk spring 7 such that it cannot twist (FIG. 1). Thereby wear caused by twisting of the annular part 13 relative to the disk spring tongues is avoided or at least limited.

The annular part 13 is arranged such that detachment is prevented by means of a spring part 20 that is arranged on the other side of the disk spring tongues 10. For that purpose, the spring part 20 is supported axially on the disk spring tongues 10 and extends through the annular part 13, in which corresponding openings 21 are provided (see FIG. 3). The annular part 13 is axially clamped to the disk spring tongues 10 by means of the tongues 22, which extend around the annular bead 23 of the annular part 13.

The shaped wire spring 14 is introduced into the inner periphery of the annular part 13 and is supported axially against a radially inwardly directed locating surface 24. To connect the actuation device to the pulling device, the actuation sleeve (not shown) is pushed axially into the annular part 13, and thereby the shaped wire spring 14 is widened by that installation step. To prevent the simultaneous occurrence of an axial displacement of the shaped wire spring 14, the spring is radially deformed to form radial lugs 25 that extend into openings 26 in the annular part 13. The openings 26 are in this case in the form of an elongated hole in the axial direction, whereby the diameter of the axial extension 27 of the annular part simultaneously increases in the axial direction, so that by axial displacement the diameter of the shaped wire spring 14 can widen more easily. During the return stage of the actuation sleeve, the shaped spring 14 snap-fits into the return element and axially secures the actuation sleeve relative to the annular part 13. That snap-fit closure is released—for example during repair—by pressing the two radially outwardly guided ends 28 of the shaped wire spring 14 apart that leads to the shaped wire spring 14 being widened so that the actuation sleeve can be withdrawn from the extension 27.

FIG. 3 shows the annular part 13 in a view of the flange 16 and the axial extension 27. The annular part is made from sheet metal by means of a multiple-step forming and stamping method, wherein the openings 21, 26 can readily be punched out of the circular blank in a die. As a result of appropriate plastic forming steps, the extension 27 and the various indentations are given their final shape only once those steps have been performed. The annular part 13 can be made by a descending tool in a punching and forming method. The openings 26 are made in the axial extension 27 for the shaped wire spring to engage. The ends of the shaped wire spring are guided out of an opening 26. The flange 16 includes the openings 21 through which tongues 22 of the spring part 20 (FIG. 2) extend.

The lugs 18 for preventing the annular part 13 from turning relative to the disk spring 7 are preferably formed by an extrusion process. In that regard, FIG. 4 shows a detail of the annular part 13 in cross section. During the manufacturing process a punch is pressed into the flange 16 on the opposite side of the flange 16 to that having the lugs 18, and that punch leaves an indentation 29. The displaced material is pressed into a recess in the manufacturing tool and forms the lug 18. The height of the lug 18 varies in the radial direction to form a curved upper surface, with the result that when the disk spring tongues are displaced during an actuation procedure, at least part of the lug 18 extends into the slot 19 between the disk spring tongues 10.

Figure 5:
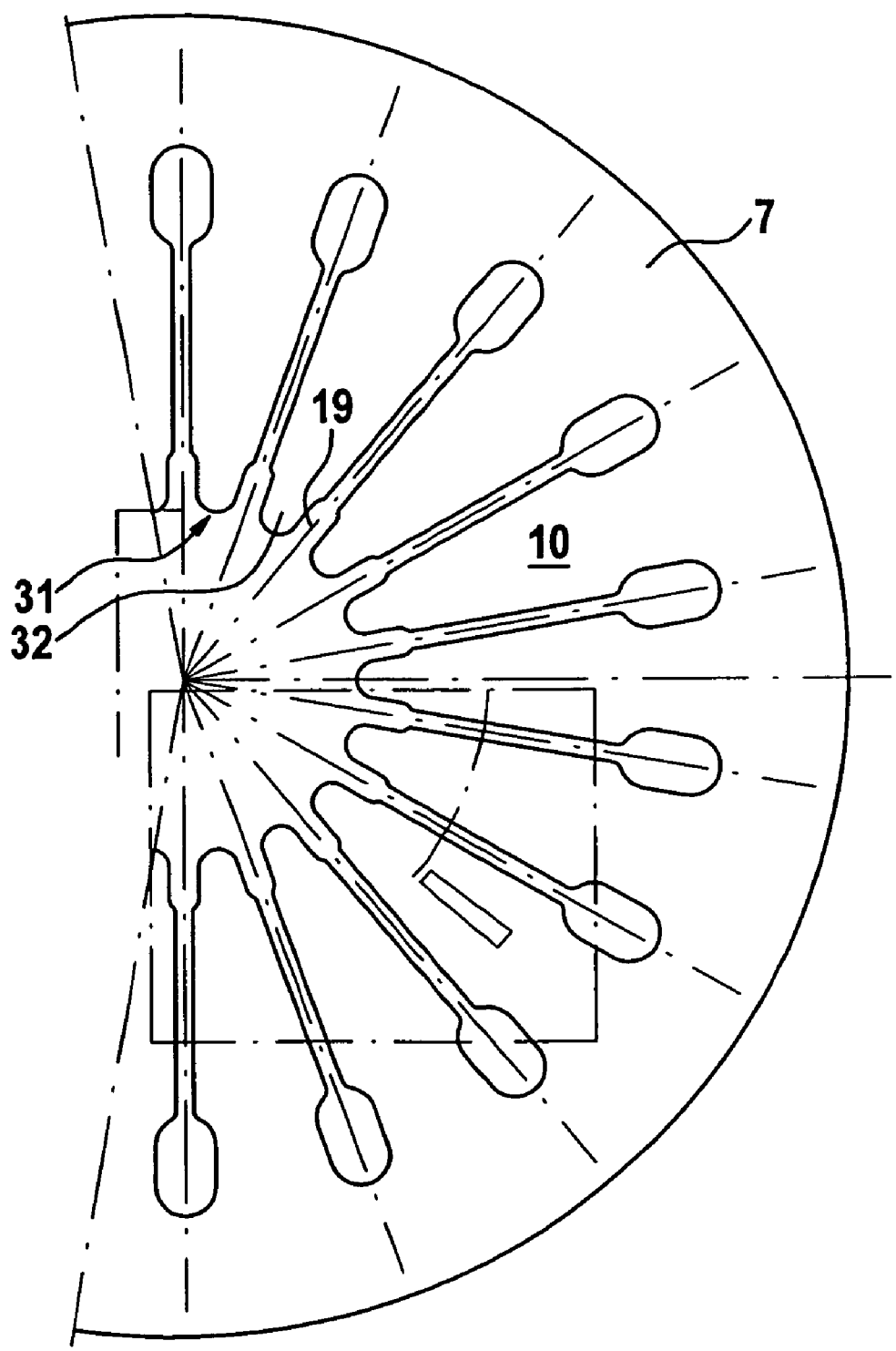
FIG. 5 is a front view of the disk spring of the clutch shown in FIG. 1.

FIG. 5 shows a detail of a disk spring 7 in a front view. At the disk spring tongue tips 31, on the inner periphery of the disk spring 7, the disk spring tongues 10 have a profile 32 of reduced width, with the result that wider slots 19 are produced in which the lugs 18 engage (FIG. 4). As a result of the slots 19 being widened, the lugs 18 can be made wider and hence are easier to produce in a forming process. The profiles 32 can have a rounded shape at the inner periphery of the disk spring 7, and can be produced during the process of punching the disk spring. The disk spring tongue tips 31 can be partially hardened, in addition to the hardening process of the disk spring 7, such as by induction hardening.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A friction clutch comprising:
    a compression plate,
    a housing,
    a pressure plate that is rotatably fixed and axially displaceable relative to the compression plate and the housing,
    a disk spring supported against the housing for displacing the pressure plate, the disk spring having an annular body and a plurality of radially-inwardly-extending and circumferentially spaced disk spring tongues,
    an annular part having a radially-outwardly-extending flange in contact with a side of the disk spring tongues that axially face the pressure plate, wherein the flange extends radially over radially inner ends of the disk spring tongues and is axially clamped thereto, and
    wherein the annular part is clamped to the disk spring by a spring part that is supported axially on an opposite side of the disk spring tongues from that facing the pressure plate and that includes spring part tongues that extend axially through respective axial openings in the annular part and extend over a portion of the flange that faces the pressure plate to clamp the annular part axially against the disk spring tongues.

2. A friction clutch in accordance with claim 1, wherein the flange of the annular part includes a plurality of axially extending, circumferentially distributed lugs on a side of the flange facing the disk spring tongues, wherein the lugs engage in slots provided by spaces between the disk spring tongues.

3. A friction clutch in accordance with claim 2, wherein the slots are each defined by radial spaces between adjacent disk spring tongues, and wherein the slots have wider regions at their radially inner ends.

4. A friction clutch in accordance with claim 3, wherein the wider regions of the slots are radially longer than a radial length of the lugs.

5. A friction clutch in accordance with claim 1, wherein the friction clutch is a tensioned-open friction clutch.

\* \* \* \* \*